United States Patent [19]

McMahon

[11] Patent Number: 5,002,144
[45] Date of Patent: Mar. 26, 1991

[54] DEVICE AND METHOD FOR IMPARTING ORIBTAL MOTION TO A WHEELED CARRIAGE

[75] Inventor: Newton McMahon, Darling Point, Australia

[73] Assignee: Lesbar Pty Limited, North Parramatta, Australia

[21] Appl. No.: 348,723

[22] PCT Filed: Aug. 1, 1988

[86] PCT No.: PCT/AU88/00282
§ 371 Date: Apr. 4, 1989
§ 102(e) Date: Apr. 4, 1989

[87] PCT Pub. No.: WO89/00942
PCT Pub. Date: Feb. 9, 1989

[30] Foreign Application Priority Data

Aug. 4, 1987 [AU] Australia ............................... P13595

[51] Int. Cl.$^5$ ........................... A47D 9/04; B62B 9/72
[52] U.S. Cl. ......................................... 180/166; 5/108
[58] Field of Search ............... 280/47.1; 180/199, 203, 180/166; 5/108, 109; 128/33

[56] References Cited

U.S. PATENT DOCUMENTS

| | | | |
|---|---|---|---|
| 2,888,086 | 5/1956 | O'Brien | 180/166 |
| 3,225,365 | 12/1965 | Miller et al. | 5/109 |
| 3,628,620 | 12/1971 | Byers | 180/166 |
| 4,586,492 | 5/1987 | Manahan | 5/109 |
| 4,620,334 | 11/1986 | Robinson | 5/108 |

FOREIGN PATENT DOCUMENTS 2954584 3/1985 Australia .
2427238 12/1979 France .

Primary Examiner—Charles A. Marmor
Assistant Examiner—Richard Camby
Attorney, Agent, or Firm—Helfgott & Karas

[57] ABSTRACT

A device for imparting an orbital and oscillation motion to a wheeled carriage, a cot, or the like, for soothing a baby; the device comprises a housing having an upper section and a lower section. The upper section is provided with molded concave sections adapted to receive the wheels of the carriage, cot or the like, and the lower section is provided on a substantially. flat surface. Within the housing, a drive is positioned to provide relative movement between the sections.

7 Claims, 2 Drawing Sheets

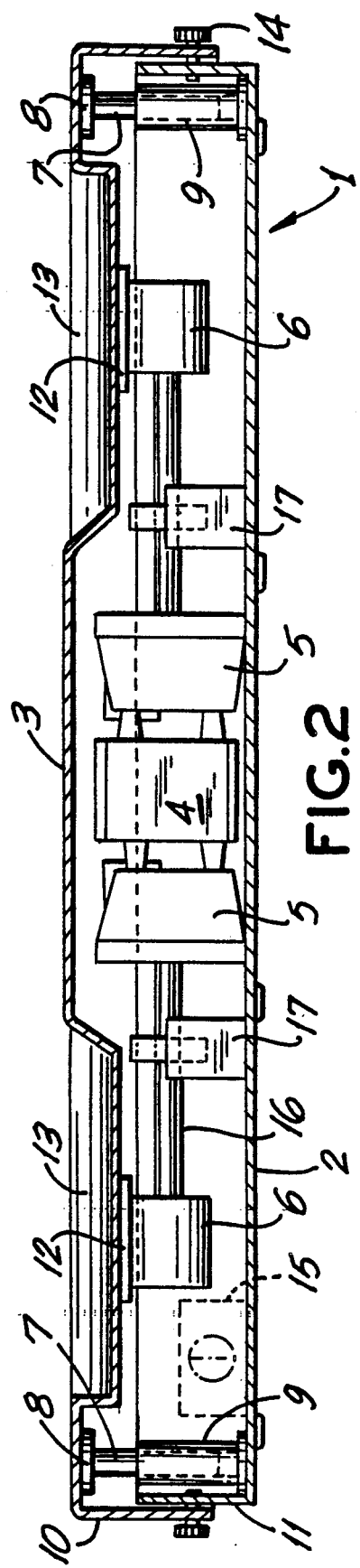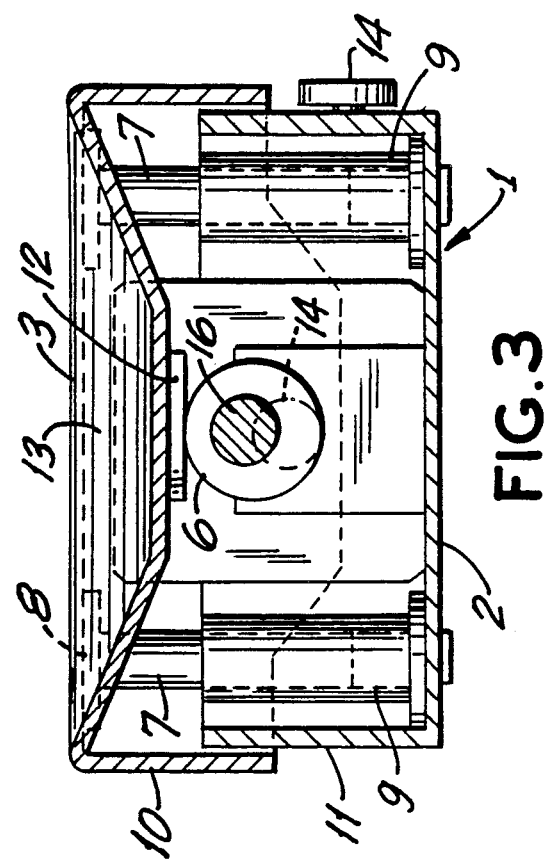

DEVICE AND METHOD FOR IMPARTING ORIBTAL MOTION TO A WHEELED CARRIAGE

The present invention relates to a device and method for imparting orbital motion to a wheeled carriage, and in particular, to providing orbital motion to a baby carriage. Such orbital motion has been proven to be soothing to a distraught baby.

One of the most distressing experiences of any adult is the continuous crying of a baby. In many cases the baby may be soothed easily, for example by feeding, however, there are times when adults find the only way to soothe the baby is by rocking the baby in a carriage or cot or the like. Unfortunately, in our modern society, it is becoming increasingly rare that adults have the time available to soothe an infant in this manner.

The reason infants are soothed by continuous motion is not considered in depth here but has been assumed to stem from the infants pre-natal period within the mother's womb.

It is a well known fact that continuous motion is an effective method of soothing a disturbed baby however the reasons behind this fact are not as well known.

In the development of the present invention it was considered that the reason babies are soothed by continuous motion stems back to the babies pre-natal life within the mothers womb, a period of well-being and security for the baby.

Many devices other than motion producing devices have been developed in an attempt to trigger a feeling of well-being within a disturbed baby, such as recordings of a mothers heart beat as would be heard by the foetus in the placenta, recordings of placental noise, etc. It is considered that these devices only achieve the desired result when they are placed in combination with other triggering mechanisms.

In consideration of the prior art, Australian Patent Application AU-A-21314/83 by Blou is directed towards an apparatus for automatically rocking a child's bed to soothe a child or baby. Although this invention describes the principle of imparting motion to a wheeled baby carriage the aspect of foetal movement within the placenta has not been considered. As a result the accelerations and decelerations of the wheeled baby carriage in a to and fro direction do not emulate the natural motion of a foetus within a placenta, and, as such, may not trigger the feeling of well-being so desired. AU-A-21314/83, although combining vertical and horizontal vector components within the bases described, does not achieve a smoothe orbital motion as is the case of the present invention, but a jerked to and fro, acceleration - deceleration motion due to the method of attachment of the baby carriage to the device. Furthermore, this invention could not be considered portable due to the bulk of the device, and, as such, would not prove useful to a modern mother on-the-go.

Australian Patent Application AU-A-54037/86 by Toyer is also directed towards a bed rocking apparatus. Although Toyer has recognised the benefits available to adults, the needs of infants have been neglected, and subsequently, the invention of AU-A-54037/86 by Toyer is subject to a vertical to and fro movement due to the method of attachment of the bed to the device, and, as such, does not emulate the orbital motion encountered by a foetus in a placenta and will go little way to triggering a baby's foetal recollection. Furthermore, the device of AU-A-54037/86 is substantially bulky and burdensome, and, as such, although claimed to be portable, does not lend itself to use by a modern mother.

The present invention seeks to overcome or at least ameliorate the problems associated with the prior art and offer adults a truely portable device which will soothe a disturbed infant by triggering foetal recollections of well being.

In one broad form, the present invention provides a device for imparting orbital motion to a wheeled baby carriage or cot, said device comprising a housing having upper and lower sections, said upper section adapted to receive wheels of said baby carriage or cot, and said lower section adapted to support said device on a substantially flat surface; and, drive means located within said housing, adapted to provide relative movement between each of said upper and lower sections such that relative orbital movement is imparted to said baby carriage or cot positioned on said upper section.

In a further broad form, the present invention provides a device for imparting orbital motion to a wheeled baby carriage or cot said device comprising:

a housing formed in two slidably engageable halves, a bottom half for mounting said device on a flat surface and an upper half formed to accept at least two co-axially mounted wheels of a baby carriage, drive means located within the two slidably engageable halves of the housing having at least two co-axially aligned shafts mounted at opposite ends thereof, said shafts extending in substantially parallel relationships to an axis of said at least two co-axially aligned shafts mounted at opposite ends thereof, said shafts extending in substantially parallel relationships to an axis of said at least two co-axially mounted wheels of a baby carriage, at least two torque convertors attached to the at least two co-axially aligned shafts, said torque convertors converting a low torque output from the drive means into a high torque input for at least two cams, said at least two cams connected to the torque convertors by transmission shafts, said transmission shafts are supported by a mounted bearing and being in substantially parallel relationship to the axis of said at least two-co-axially mounted wheels of a baby carriage and extending between the torque convertors and said cams, whereas in use, the upper half of the housing is caused to reciprocate by the high torque rotation of the cams being rotated by the drive means through the torque convertors.

It is a further aspect of the present invention to provide a method of assembling a wheeled baby carriage onto a device for imparting orbital motion to the baby carriage whereby, said device is mounted on a substantially flat surface, at least two co-axially aligned front or rear wheels of said baby carriage are positioned on an upper half of said device to substantially describe an orbital motion, said orbital motion being translated to the baby carriage.

The invention will now be described by way of example only with reference to the accompanying drawings, in which:

FIG. 2 is a cross sectional elevation of the embodiment of FIG. 1 through line 2—2; and, FIG. 3 is a cross sectional elevation of the embodiment of FIG. 1 through line 3—3;

Figure 1:
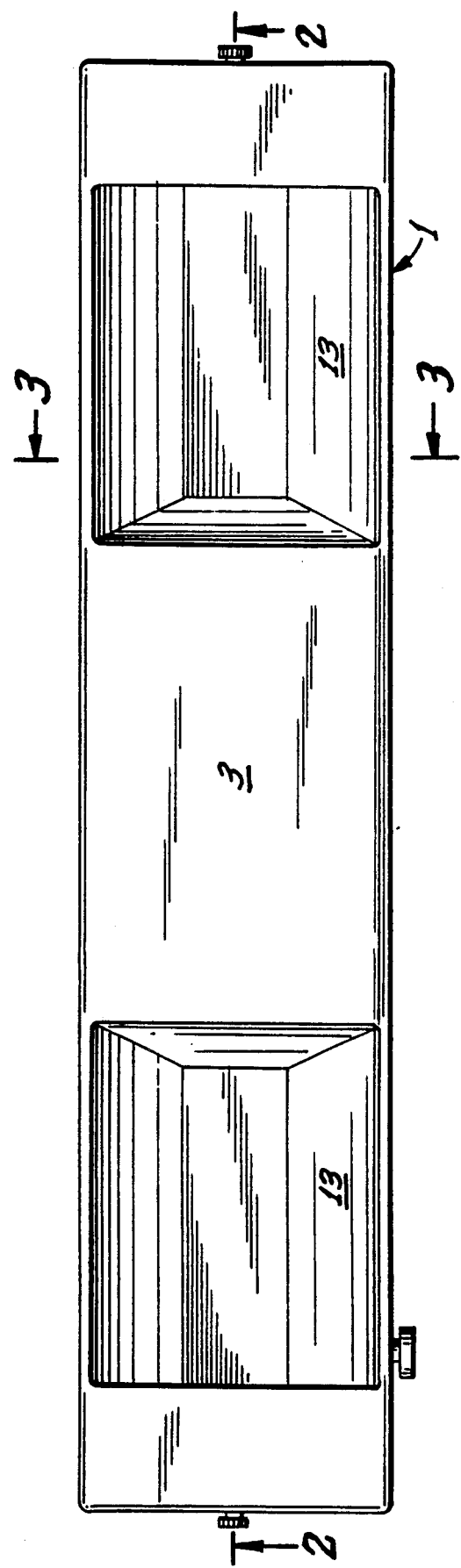
FIG. 1 is a plan view of a preferred embodiment of the present invention.

The device for imparting orbital motion to a baby's carriage or cot, generally designated by the numeral 1, is comprised of a lower housing 2 over which is slidably mounted an upper housing 3. The lower housing 2 has an electric motor 4 mounted therein by mechanical fastening means (not shown). Torque convertors 5 are mounted at each end of the electric motor 4 and driven by shafts (not shown), extending from the electric motor 4 into the torque convertors 5. The torque convertors 5 are, in turn, connected to the lifting cams 6 by cam shafts 16 which are supported by mounted bearings 17.

Application of electricity to the electric motor 4 causes the electric motor 4 to rotate the lifting cam 6 by driving through the torque convertors 5. The torque convertors 5 increase the torque from the electric motor to enable the lifting cams 6 to raise and lower the upper housing 3 against the weight of the baby carriage or cot (not shown) as may be distributed across it.

To ensure the upper housing 3 is uniformly raised and lowered by the lifting cams 6, four pistons 7 are extended from the upper housing 3. The pistons 7 are secured to the lower housing 3 by way of bosses 8. To ensure sufficient contact surface between the pistons 7 and the upper housing 3, bearing bosses 8 are integrally formed with the upper housing 3. To prevent skewing of the upper housing 3 the pistons slide within cylinders 9 mounted in a relative position to the lower housing 2. To further prevent skewing, the sides 10 of the upper housing 3 are formed to slidably fit over and outside of the lower housing sides 11 of the lower housing 2. The upper housing is held in place by way of regulating screws 14 located at ends AA which permits vertical travel of upper housing 3 but prevents the housings from separating.

The upper housing 3 is also provided with integrally formed bearing surfaces 12 which are located in bearing relationship to the lifting cams 6. These bearing surfaces 12 serve to prolong the life of the device.

To facilitate the orbital motion required to be imparted to the baby carriage or cot (not shown), the upper housing 3 has integrally formed concave surfaces 13 in which the wheels of the baby carriage or cot (not shown) are located. These surfaces 13 may either be two dimensionally concave or three-dimensionally concave.

By placing the front or rear wheels of a baby carriage not shown) on the upper housing 3 such that they are located within the formed concave surfaces 13 and causing the upper housing 3 to oscillate as previously described, the wheels of the baby carriage or cot are lifted, this lifting also causes the wheels to try to ride up the concave surface while gravity causes the wheels (not shown) to roll back to the natural position thus causing the baby carriage wheels located in the formed concave surfaces 13 to describe an arcuate movement of 180°. As the upper housing 3 is lowered, the wheels of the baby carriage or cot are also lowered to their starting position, however, as the baby carriage or cot has moved forward of its original position the wheels of the baby carriage or cot are once again caused to ride up the concave surface whilst gravity causes the wheels to roll back to the natural position thus causing the wheels of the baby carriage or cot, located in the concave surfaces 13 to describe an arcuate movement of 180° opposite to the arcuate movement described hereinbefore when the upper housing 3 lifts the wheels. The nett result is that the wheels of the baby carriage or cot are caused to describe a full orbit of 360° during one oscillation of the upper housing 3 of the device 1.

It is believed that this type of constant radial acceleration and orbital motion best describes the motion undergone by a foetus within a placenta, and thus, best triggers a baby's foetal recollection of well being and security experienced within a mothers womb.

As the radial acceleration and orbital motion experienced by a foetus during pregnancy will vary from mother to mother, the device 1 is fitted with a torque control 15 to control the torque applied to the lifting cams 6. These cams are of constant diameter but have projections of varying dimensions. Thus the vertical acceleration applied to the upper housing 3 through greater torque being applied in conjunction with a cam 6 having a higher projection results in a greater orbital motion and radial acceleration being applied to the baby carriage or cot.

The torque control 15 permits sufficient torque application to shafts and cams to enable the device to easily lift heavier carriages and/or cots.

In application of the device of the present invention to a baby carriage to facilitate the portability of the device 1 the height of the device 1 is about 80 mm, the length is about 700 mm and the width is about 150 mm, with an all up weight of about 4 kg. This size and weight will facilitate easily handling by mothers who also have other things to contest with like their babies.

It is intended that the device be formed of plastic to reduce the all up weight, however any sturdy material may be used.

In application of the device of the present invention to a cot, still allows the device to become portable. The device may, however by constructed in any size, depending on the particular application.

While particular embodiments of this invention have been described, it will be evident to those skilled in the art that the present invention may be embodiment in other specific forms without departing from the essential characteristics thereof. The present embodiments and examples are therefore to be considered in all respects as illustrative and not restrictive, the scope of the invention being indicated by the appended claims rather than by the foregoing description, and all changes which come within the meaning the range of equivalency of the claims are therefore intended to be embraced therein.

I claim:

1. A device for imparting oscillation motion to a wheeled baby carriage or cot, the device comprising:

a housing having an upper section and a lower section, said upper section having upwardly facing concave surfaces and receiving and supporting wheels of the baby carriage or cot thereon, said lower section being adapted to support said device on a substantially flat surface;

drive means located within said housing and adapted to impart a vertical oscillation movement to said upper section relative to said lower section;

cylinders integrally formed in said lower section; and pistons connected to and extending downwardly from said upper section and adapted to engage in said cylinders in said lower section to limit the amount of said oscillation movement between said sections and prevent skewing of said upper section, whereby oscillatory and orbital motions are imparted to said wheels of the baby carriage or cot, resulting from said vertical oscillation movement and a rolling motion of said wheels along said concave surface as said upper section with said carriage or cot thereon is lifted relative to said lower section by said drive means.

2. The device as claimed in claim 1, wherein said drive means comprise a pair of lifting cams engaging said upper section at an underside thereof and spaced from each other, two torque converters connected to said cams, and an electric motor connected to said torque converters and adapted to rotate said lifting cams via said torque converters so that each lifting cam imparts said vertical oscillation movement to said upper section against the weight of said baby carriage or cot positioned thereon.

3. The device as claimed in claim 1, wherein four of said pistons are provided in said housing, which are connected in spaced apart relationship.

4. The device as claimed in claim 1, wherein said upwardly facing concave surfaces are two-dimensionally concave, across a longitudinal axis of said device.

5. The device as claimed in claim 1, wherein said upwardly facing concave surfaces are three-dimensionally concave, across both longitudinal and transverse axes of said device.

6. A device for imparting orbital motion to a wheeled baby carriage or cot, the device comprising:

a housing including two slidably engageable halves, a bottom half being adapted for mounting said device on a flat surface and an upper half being formed to receive at least two co-axially mounted wheels of a baby carriage; and drive means located within said two slidably engageable halves of the housing and including a drive, at least two co-axially aligned shafts mounted at opposite ends of said drive, said shafts each extending in a substantially parallel relationship to an axis of said at least two co-axially mounted wheels of a baby carriage, at least two torque convertors attached to said at least two co-axially aligned shafts, respectively, and at least two cams, said torque convertors converting a low torque output from said drive into a high torque input for said at least two cams, said at least two cams being connected to said torque convertors, respectively, by transmission shafts, said transmission shafts being each supported by a bearing and being in substantially parallel relationship to the axis of said at least two-co-axially mounted wheels of a baby carriage and extending between said torque convertors and said cams, wherein in use, the upper half of said housing is caused to oscillate by the high torque rotation of said at least two cams being rotated by said drive means through said at least two torque convertors.

7. The device as claimed in claim 6, wherein said drive comprises an electric motor adapted to rotate each cam via a respective torque converter, such that each of said cams is adapted to raise and lower said upper half against the weight of the baby carriage or cot positioned thereon.

* * * * *